United States Patent
Chen et al.

(10) Patent No.: US 11,956,670 B2
(45) Date of Patent: Apr. 9, 2024

(54) DIFFERENTIATION BETWEEN TRAFFIC IN L2 RELAY

(71) Applicant: Apple Inc., Cupertino, CA (US)

(72) Inventors: Yuqin Chen, Beijing (CN); Dawei Zhang, Saratoga, CA (US); Fangli Xu, Beijing (CN); Haijing Hu, Los Gatos, CA (US); Longda Xing, San Jose, CA (US); Murtaza A. Shikari, Mountain View, CA (US); Sethuraman Gurumoorthy, San Ramon, CA (US); Sree Ram Kodali, San Jose, CA (US); Srinivasan Nimmala, San Jose, CA (US); Srirang A Lovlekar, Fremont, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 17/593,335

(22) PCT Filed: Oct. 22, 2020

(86) PCT No.: PCT/CN2020/122823
§ 371 (c)(1),
(2) Date: Sep. 15, 2021

(87) PCT Pub. No.: WO2022/082597
PCT Pub. Date: Apr. 28, 2022

(65) Prior Publication Data
US 2022/0312262 A1 Sep. 29, 2022

(51) Int. Cl.
*H04W 28/06* (2009.01)
*H04W 40/22* (2009.01)
(Continued)

(52) U.S. Cl.
CPC ........... *H04W 28/06* (2013.01); *H04W 40/22* (2013.01); *H04W 76/14* (2018.02); *H04W 88/04* (2013.01); *H04W 92/18* (2013.01)

(58) Field of Classification Search
CPC ..... H04W 28/06; H04W 76/14; H04W 40/22; H04W 88/04; H04W 92/18
See application file for complete search history.

(56) References Cited

U.S. PATENT DOCUMENTS 11,553,459 B2 *  1/2023  Jin .................... H04W 72/0446
11,564,126 B2 *  1/2023  Pan ....................... H04L 1/1874
(Continued)

FOREIGN PATENT DOCUMENTS

CN    108307528    7/2018
WO    2017/146447  8/2017

OTHER PUBLICATIONS

CATT, "V2X Sidelink MAC Subheader"; 3GPP TSG RAN WG2 Meeting #94; R2-163418; May 27, 2016; 2 sheets.
(Continued)

*Primary Examiner* — Chandrahas B Patel
(74) *Attorney, Agent, or Firm* — Fay Kaplun & Marcin, LLP

(57) ABSTRACT

A user equipment (UE) is configured to communicate with a further UE via a sidelink (SL). The UE encodes traffic for transmission to the further UE, wherein the traffic comprises a payload and a medium access control (MAC) subheader, wherein the MAC subheader indicates whether the payload corresponds to non-routed traffic between the UE and the further UE or routed traffic between either one of the UE or the further UE and a base station, wherein an other one of the UE or the further UE functions as a relay for the routed traffic and transmits the traffic.

20 Claims, 7 Drawing Sheets

(51) Int. Cl.
*H04W 76/14* (2018.01)
*H04W 88/04* (2009.01)
*H04W 92/18* (2009.01)

(56) References Cited

U.S. PATENT DOCUMENTS

2019/0059015 A1* 2/2019 Lee .................. H04W 28/0205
2022/0361267 A1* 11/2022 Wang .................. H04W 76/14

OTHER PUBLICATIONS

Nokia et al., "Discussion on MAC subheader structures for IAB"; 3GPP TSG-RAN WG2 Meeting #107bis; R2-1913212; Oct. 18, 2019; 2 sheets.

* cited by examiner

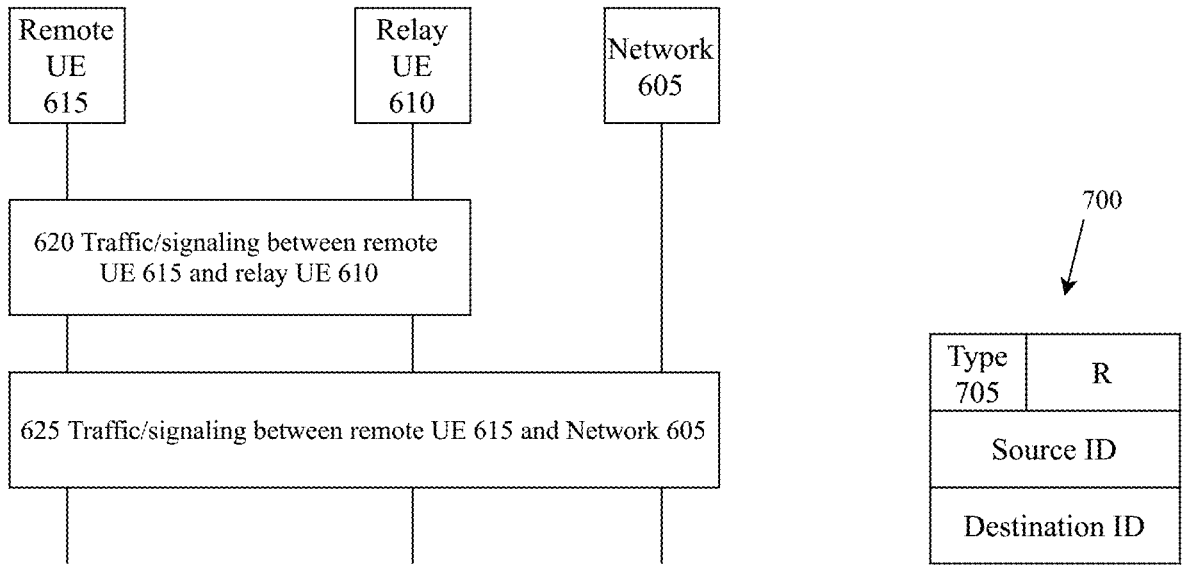
Fig. 6
Fig. 7a
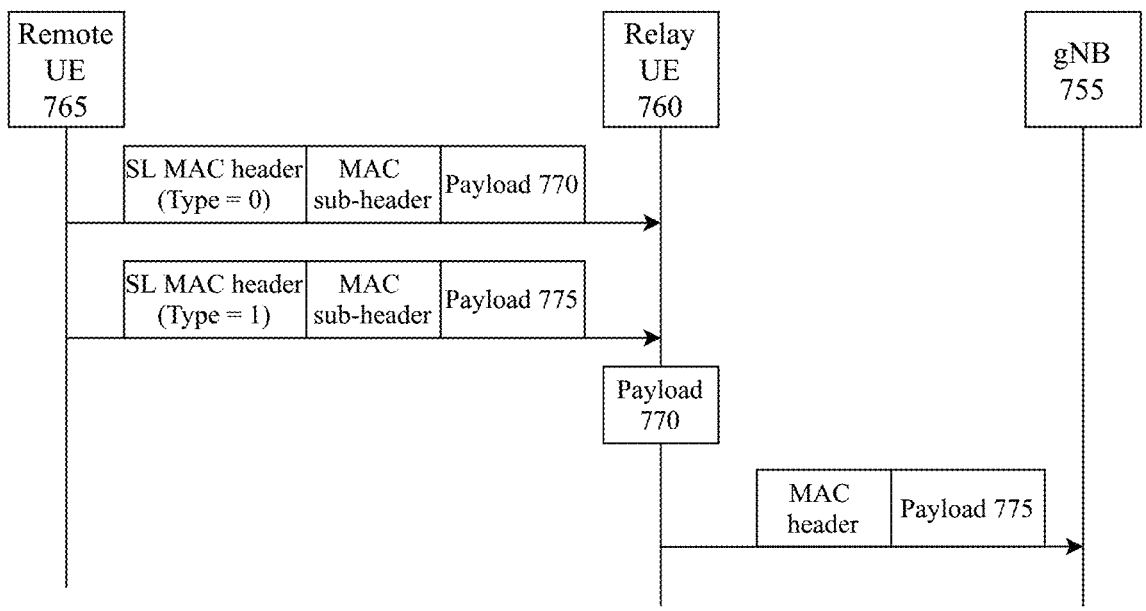
Fig. 7b

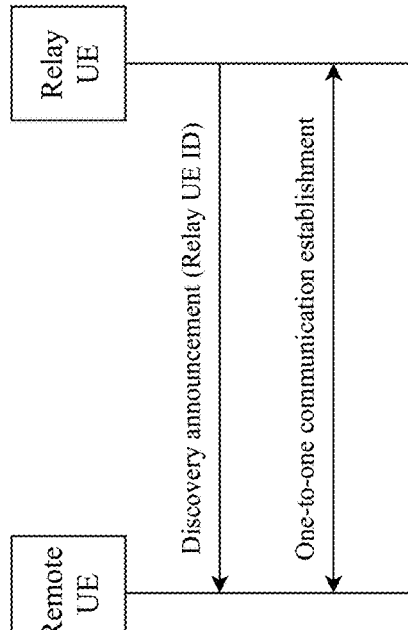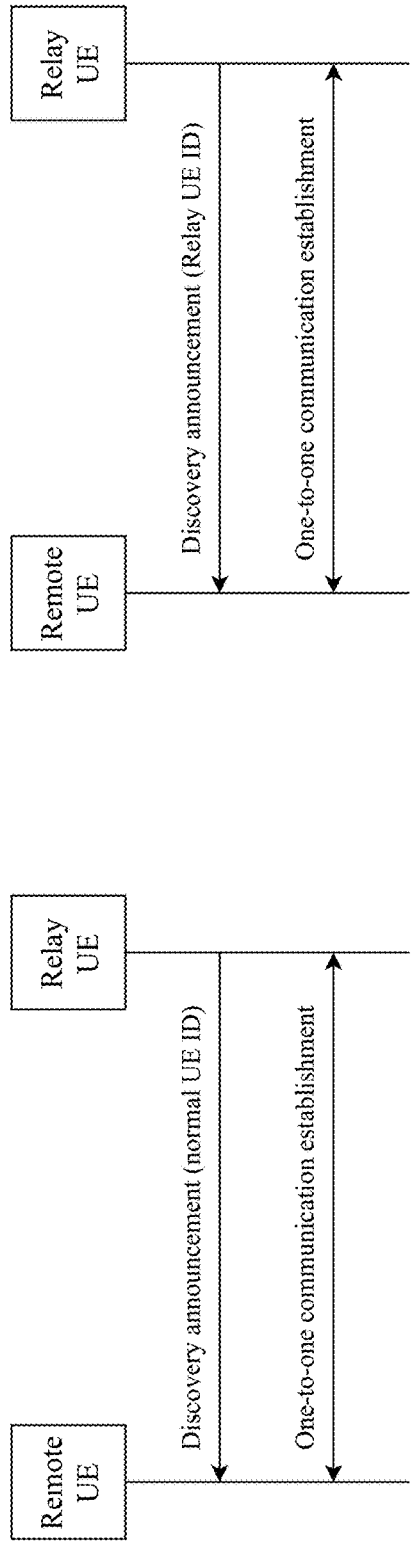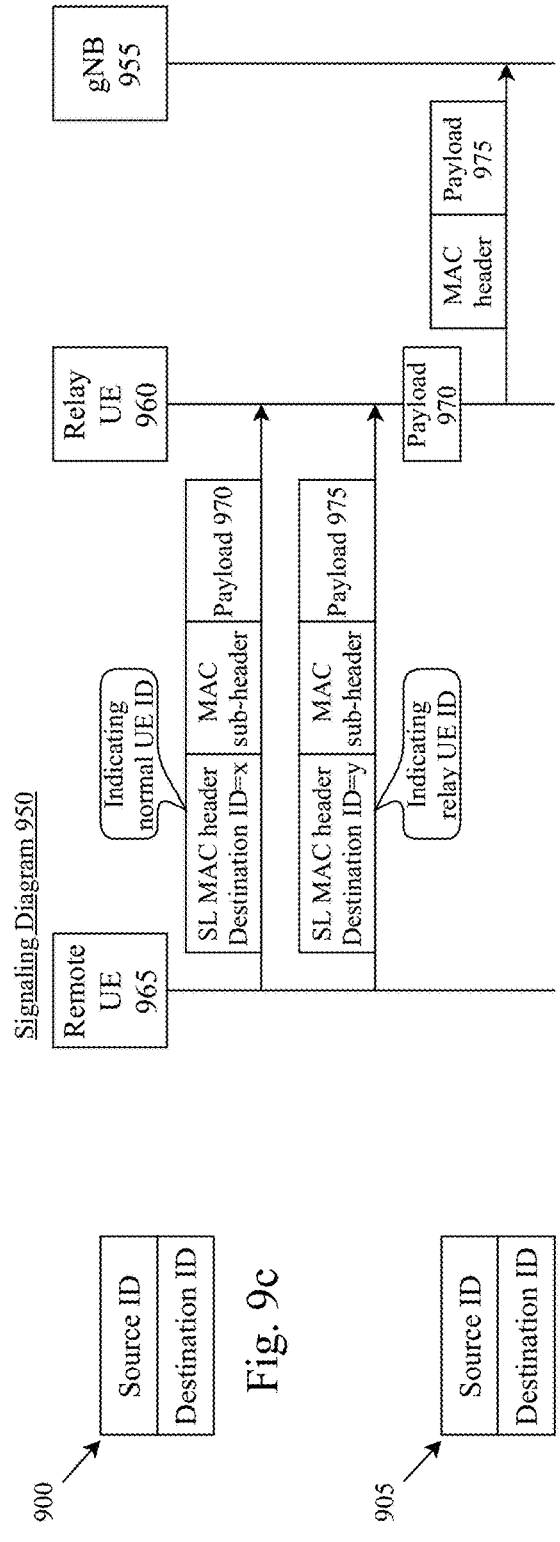

US 11,956,670 B2

DIFFERENTIATION BETWEEN TRAFFIC IN L2 RELAY

BACKGROUND INFORMATION

A user equipment (UE) may be configured with multiple communication links. For example, the UE may receive a signal from a cell of a corresponding network over a downlink and may transmit a signal to the cell of the corresponding network over an uplink. The UE may also be configured to communicate with a further UE via a sidelink (SL). The term sidelink refers to a communication link that may be utilized for device-to-device (D2D) communication.

The SL may be used for relay assistance that may comprise forwarding data/signals from a network via a relay UE to a remote UE that is out of range of the network and/or has poor network coverage. A Layer 2 (L2) relay amplifies received signals to the destination after successful decoding/encoding and demodulation/modulation of the signals. In the L2 UE-to-NW relay, two types of traffic may be carried in the SL between the remote UE and the relay UE. A first type of traffic (data/signaling) may be intended to terminate at the relay UE (non-routed traffic between the remote UE and relay UE), while a second type of traffic may be intended to not terminate at the relay UE (routed traffic between the remote UE and the network). Thus, the relay UE has two roles for delivery (relay and not relay) when dealing with traffic to/from the remote UE.

For the L2 relay, in the uplink (UL), the remote UE is not currently able to inform the relay UE about the destination (relay UE or network) of the traffic it transmits on the UL. In the downlink (DL), if the relay UE combines the two kinds of traffic (routed and non-routed) together, the remote UE is not able to deliver different traffic into different RLC/PDCP layers.

SUMMARY

Some exemplary embodiments are related to a user equipment (UE) having a transceiver configured to communicate with at least a further UE via a sidelink (SL) and a processor communicatively coupled to the transceiver and configured to perform operations. The operations include encoding traffic for transmission to the further UE, wherein the traffic comprises a payload and a medium access control (MAC) subheader, wherein the MAC subheader indicates whether the payload corresponds to non-routed traffic between the UE and the further UE or routed traffic between either one of the UE or the further UE and a base station, wherein an other one of the UE or the further UE functions as a relay for the routed traffic and transmitting the traffic.

Other exemplary embodiments are related to a processor of a user equipment (UE) configured to perform operations. The operations include encoding traffic for transmission from the UE connected to a further UE via a sidelink (SL), wherein the traffic comprises a payload and a medium access control (MAC) subheader, wherein the MAC subheader indicates whether the payload corresponds to non-routed traffic between the UE and the further UE or routed traffic between either one of the UE or the further UE and a base station, wherein an other one of the UE or the further UE functions as a relay for the routed traffic and transmitting the traffic.

Still further exemplary embodiments are related to a user equipment (UE) having a transceiver configured to communicate with at least a further UE via a sidelink (SL) and a processor communicatively coupled to the transceiver and configured to perform operations. The operations include receiving encoded traffic from the further UE, wherein the encoded traffic comprises a payload and a medium access control (MAC) subheader, wherein the MAC subheader indicates whether the payload corresponds to non-routed traffic between the UE and the further UE or routed traffic between either one of the UE or the further UE and a base station, wherein an other one of the UE or the further UE functions as a relay for the routed traffic and decoding the encoded traffic.

BRIEF DESCRIPTION OF THE DRAWINGS

FIG. 6 shows an exemplary diagram for the two types of data/signaling traffic that may be carried between a relay UE and a remote UE connected by a sidelink (SL).

FIG. 7a shows a sidelink (SL) MAC subheader with a one-bit Type field for indicating UE-UE traffic or UE-NW relay traffic over a SL.

FIG. 7b shows a signaling diagram for traffic transmitted between a remote UE, a relay UE and a gNB according to a first exemplary embodiment.

FIGS. 9a-9b show discovery procedures using two UE IDs for the relay UE.

FIGS. 9c-9d show SL MAC subheaders for the uplink (UL) and the downlink (DL), respectively, according to a third exemplary embodiment.

FIG. 9e shows a signaling diagram for traffic transmitted between a remote UE, a relay UE and a gNB according to a third exemplary embodiment.

DETAILED DESCRIPTION

Figure 1:
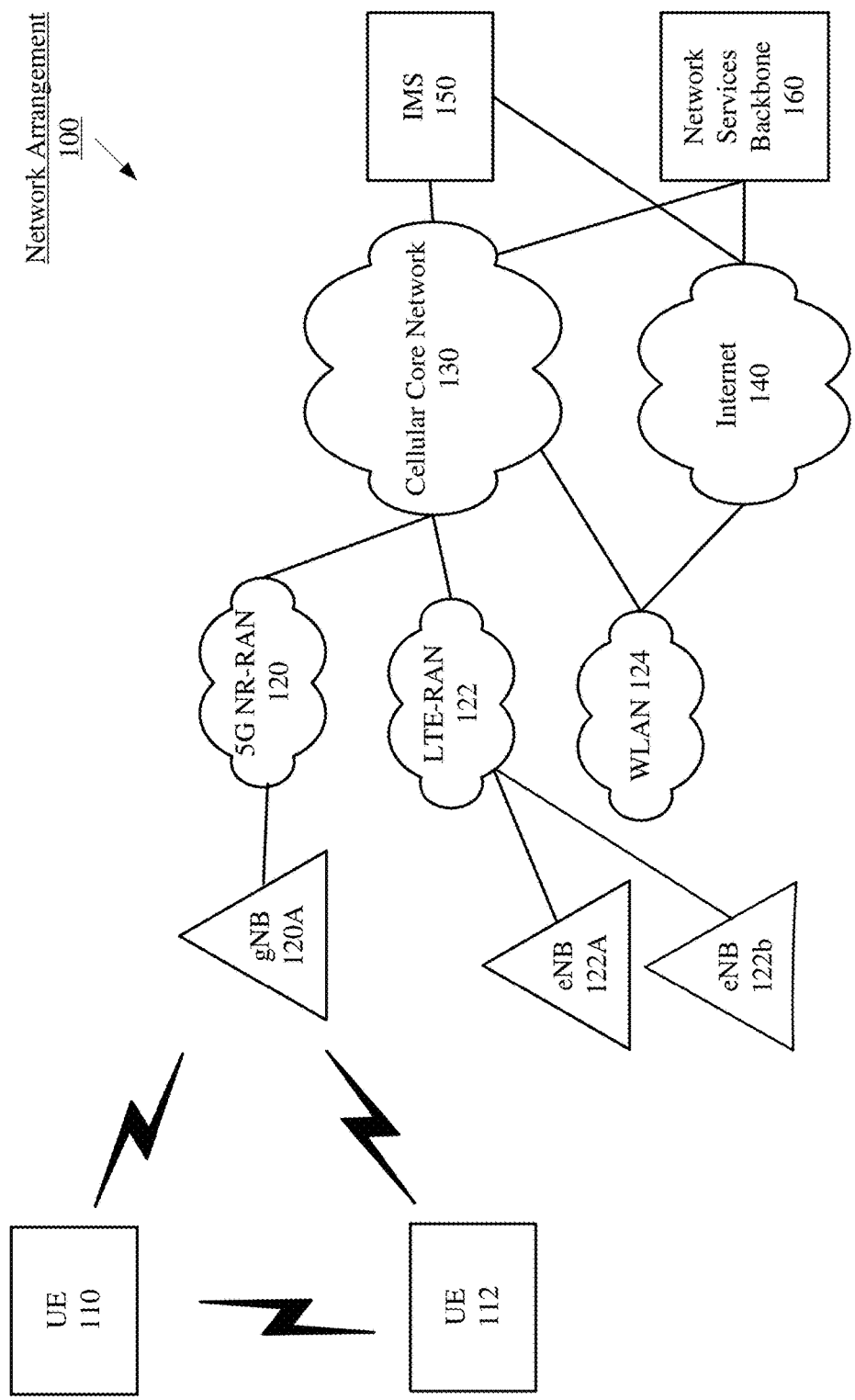
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to operations for differentiating two types of traffic received at a relay user equipment (UE) in a Layer 2 (L2) relay configuration with a base station and a remote UE. The relay UE and the remote UE are configured with a sidelink (SL) connection, and the relay UE may forward messages from the remote UE to the base station, or from the base station to the remote UE (routed traffic). However, the remote UE and the relay UE may transmit data/signaling to each other independently of the network (non-routed traffic).

The operations described herein relate to schemes for identifying which traffic is routed and which traffic is non-routed.

The exemplary embodiments are described with regard to a UE. However, the use of a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to a sidelink (SL). The term "sidelink" generally refers to a communication link between the UE and a further UE. The SL provides direct device-to-device (D2D) communication where information and/or data exchanged between the UE and the further UE via the sidelink does not go through a cell. In some configurations, a single SL provides bidirectional data communication between the UE and the further UE. In other configurations, a single SL provides unidirectional data communication between the UE and the further UE, although signaling may be transmitted in both directions. The term "unicast" refers to one-to-one, i.e. D2D, communication and generally may refer to either bidirectional or unidirectional communication. Various embodiments may apply to either one or both forms of communication as indicated below.

SL communications are supported by both Long-Term Evolution (LTE) and 5G new radio (NR) standards. In some configurations, the network may provide information to the UE that indicates how an SL is to be established, maintained and/or utilized. Thus, while the information and/or data exchanged over the SL does not go through a cell, the UE and the network may exchange information associated with the SL via the network cell. In other configurations, an SL is not under the control of the network. In either configuration, the first UE and the second UE may still perform synchronization procedures, discovery procedures and exchange control information corresponding to the SL.

FIG. 1 shows an exemplary network arrangement 100 according to various exemplary embodiments. The exemplary network arrangement 100 includes UEs 110, 112. Those skilled in the art will understand that the UEs 110, 112 may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. These types of networks support sidelink (SL) communication. In the exemplary network arrangement 100, the UEs 110 and 112 may be connected via SL. However, the UE 110 may also communicate with other types of networks and the UE 110 may also communicate with networks over a wired connection. Therefore, the UEs 110, 112 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN via the gNB 120A. Reference to a single gNB 120A is merely for illustrative purposes. The exemplary embodiments may apply to any appropriate number of gNBs. The UEs 110, 112 may also connect to the LTE-RAN 122 via the eNB 122A.

Those skilled in the art will understand that any association procedure may be performed for the UEs 110, 112 to connect to the 5G NR-RAN 120 and the LTE-RAN 122. For example, as discussed above, the 5G NR-RAN 120 and the LTE-RAN 122 may be associated with a particular cellular provider where the UEs 110, 112 and/or the user thereof has a contract and credential information (e.g., stored on a SIM card). Upon detecting the presence of the 5G NR-RAN 120, the UEs 110, 112 may transmit the corresponding credential information to associate with the 5G NR-RAN 120. More specifically, the UEs 110, 112 may associate with a specific base station (e.g., the gNB 120A of the 5G NR-RAN 120, the eNB 122A of the LTE-RAN 122).

The UEs 110, 112 may also communicate with one another directly using a SL. The SL is a direct device-to-device (D2D) communication link. Thus, the information and/or data transmitted directly to the other endpoint (e.g., the UE 110 or the UE 112) does not go through a cell (e.g., gNB 120A, eNB 122A). In some embodiments the UEs 110, 112 may receive information from a cell regarding how the SL is to be established, maintained and/or utilized. Thus, a network (e.g., the 5G NR-RAN 120, LTE-RAN 122) may control the SL. In other embodiments, the UEs 110, 112 may control the SL. Regardless of how the SL is controlled, the UEs 110, 112 may maintain a downlink/uplink to a currently camped cell (e.g., gNB 120A, eNB 122A) and a SL to the other UE simultaneously.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC in NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
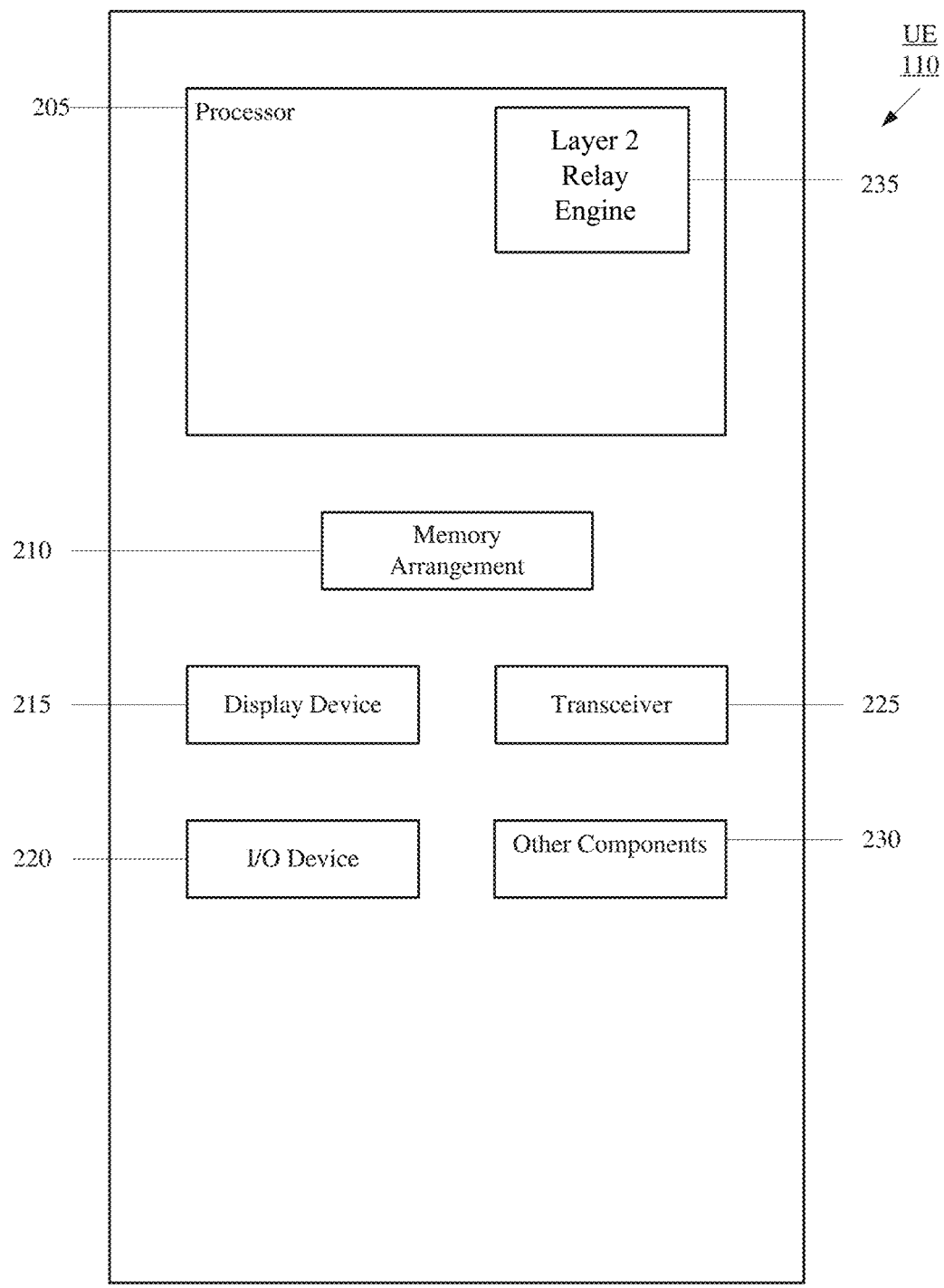
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225, and other components 230. The other components 230 may include, for example, a SIM card, an embedded SIM (eSIM), an audio input device, an audio output device, a power supply, a data acquisition device, ports to electrically connect the UE 110 to other electronic devices, etc. The UE 110 illustrated in FIG. 2 may also represent the UE 112.

The processor 205 may be configured to execute a plurality of engines of the UE 110. For example, the engines may include a Layer 2 (L2) relay engine 235. The L2 relay engine 235 may perform L2 relay operations, including forwarding traffic between a remote UE and a base station (when the UE 110 is a relay UE in the L2 relay operation) and transmitting/receiving traffic to/from a relay UE (when the UE 110 is a remote UE in the L2 relay operation). The L2 relay engine may perform further operations including differentiating two types of traffic (routed or non-routed) in the L2 relay operation, to be described in further detail below. Those skilled in the art will understand that the remote UE in an L2 relay operation may or may not also include the relay capability of the relay UE, and that that the relay UE in an L2 relay operation may or may not also include the relay capabilities of the remote UE. However, the UE 110 as described herein may be capable of operating as either one of the relay UE or the remote UE.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the WLAN 122, etc. Accordingly, the transceiver 225 may operate on a variety of different frequencies or channels (e.g., set of consecutive frequencies).

As mentioned above, device-to-device (D2D) communication may be direct between two devices or relay-assisted. Relay assistance may comprise a fixed low power relay for forwarding signals from a network to a device that is out of range of the network and/or has poor network coverage. A Layer 1 relay includes a repeater station amplifying received signals and forwarding the amplified signals to a destination, e.g. to a sidelinked (SL) UE (amplifying network signals on the downlink) or to a network component (amplifying SL UE signals on the uplink). A Layer 2 relay amplifies received signals to the destination after successful decoding/encoding and demodulation/modulation of the signals. A Layer 3 relay has similar functionality as the Layer 2 relay but includes further radio protocols. Layer 1 (L1) generally refers to a physical (PHY) layer of a UE/RAN node. Layer 2 (L2) generally refers to a medium access (MAC) layer, a radio link control (RLC) layer, and a packet data convergence protocol (PDCP) layer, and is considered a higher layer than L1. Layer 3 (L3) generally refers to a radio resource control (RRC) layer, and is considered a higher layer than L2.

Figure 3:
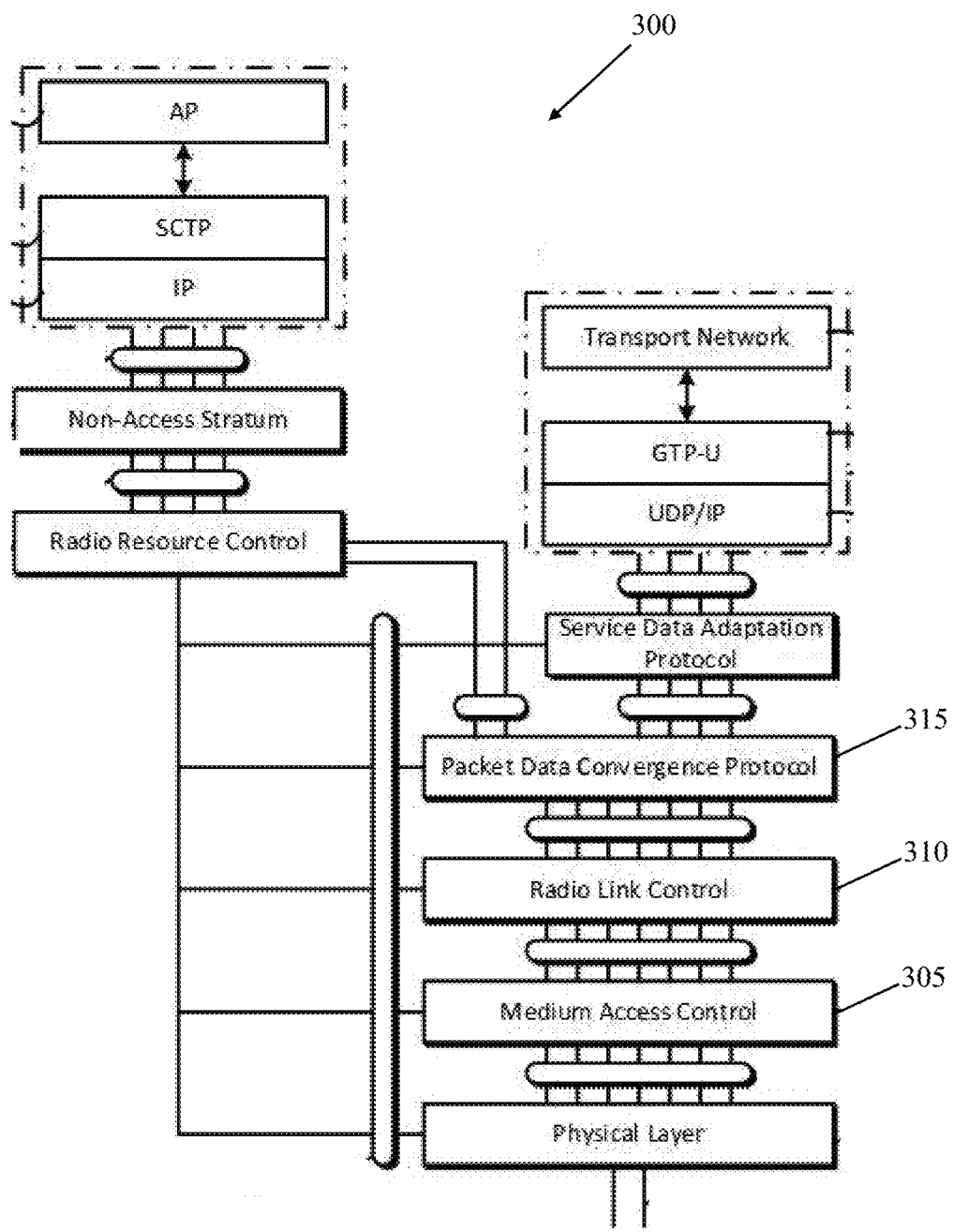
FIG. 3 shows an arrangement for various protocol functions that may be implemented in a wireless communication device according to various exemplary embodiments.

FIG. 3 shows an arrangement 300 for various protocol functions that may be implemented in a wireless communication device according to various exemplary embodiments. Specifically, FIG. 3 shows instances of a MAC layer 305, an RLC layer 310 and a PDCP layer 315.

Instance(s) of MAC 305 may process requests from, and provide indications to, an instance of RLC 310 via one or more MAC service access points (SAPs). These requests and indications communicated via the MAC-SAP may comprise one or more logical channels. The MAC 305 may perform mapping between the logical channels and transport channels, multiplexing of MAC service data units (SDUs) from one or more logical channels onto transport blocks (TBs) to be delivered to PHY via the transport channels, de-multiplexing MAC SDUs to one or more logical channels from TBs delivered from the PHY via transport channels, multiplexing MAC SDUs onto TBs, scheduling information reporting, error correction through HARQ, and logical channel prioritization.

Instance(s) of RLC 310 may process requests from and provide indications to an instance of PDCP 315 via one or more radio link control service access points (RLC-SAP). These requests and indications communicated via RLC-SAP may comprise one or more RLC channels. The RLC 630 may operate in a plurality of modes of operation, including: Transparent Mode (TM), Unacknowledged Mode (UM), and Acknowledged Mode (AM). The RLC 310 may execute transfer of upper layer protocol data units (PDUs), error correction through automatic repeat request (ARQ) for AM data transfers, and concatenation, segmentation and reassembly of RLC SDUs for UM and AM data transfers. The RLC 310 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 315 may process requests from and provide indications to instance(s) of RRC and/or instance(s) of SDAP via one or more packet data convergence protocol service access points (PDCP-SAP). These requests and indications communicated via PDCP-SAP may comprise one or more radio bearers. The PDCP 315 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Figure 4:
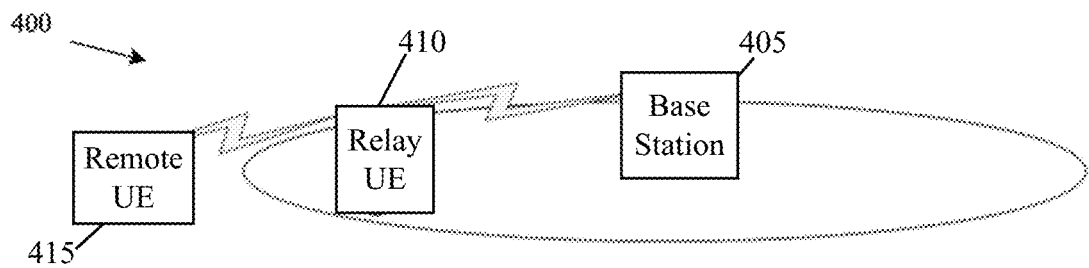
FIG. 4 shows an exemplary network diagram comprising a base station, a relay UE and a remote UE.

Layer 2 (L2) user equipment (UE) to network (NW) relay enables a remote device, e.g. a wearable device such as a watch, to access a cellular network via a relay device, e.g. a phone. FIG. 4 shows an exemplary network diagram 400 comprising a base station 405, a relay UE 410 and a remote UE 415. The relay UE 410 is shown as being within the coverage area of the base station 405 and is able to exchange signaling/data with the base station 405, while the remote UE 415 is shown as being out-of-service of the base station 405. However, in some exemplary embodiments described herein, the remote UE 415 may be within the coverage area of the base station 405 and exchange signaling/data therewith. The relay UE 410 and the remote UE 415 may be connected via a SL configured by the network as an L2 relay.

Figure 5A:
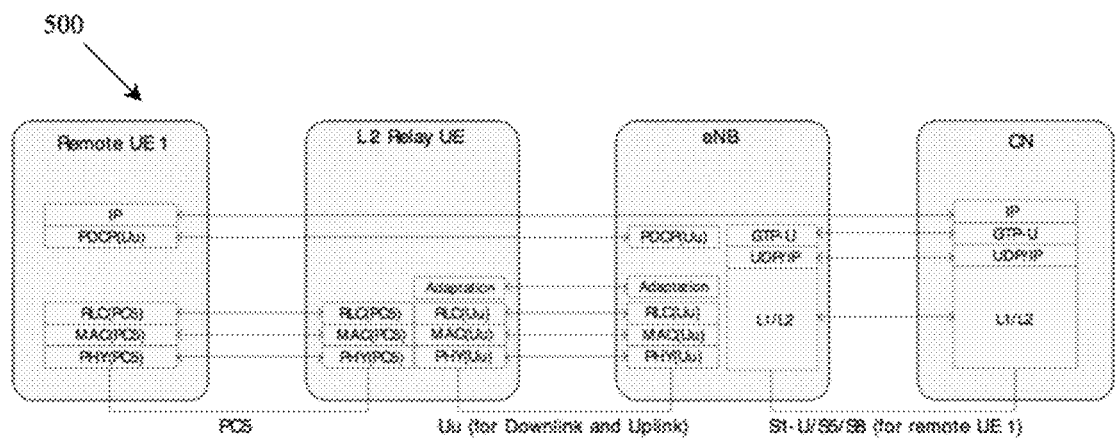
FIGS. 5a-5b show a user plane radio protocol stack and a control plane radio protocol stack 550 for L2 evolved UE-to-network relay.
Figure 5B:
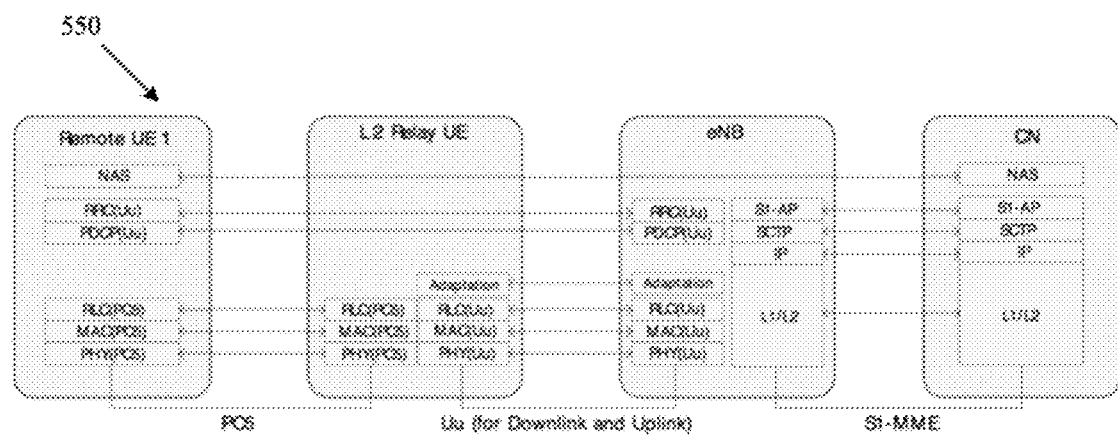

FIGS. 5*a*-5*b* show a user plane radio protocol stack 500 and a control plane radio protocol stack 550 for L2 evolved UE-to-network relay. For both protocol architectures (user plane and control plane), relaying is performed above the RLC sublayer. The Uu interface for PDCP and RRC are terminated between the remote UE and the eNB while the RLC, MAC and PHY, and the non-3GPP transport layers, are terminated in each link (remote UE to relay UE, and relay UE to network).

In a network arrangement comprising an L2 UE-to-NW relay, two kinds of traffic (data/signaling) may be carried in the SL between the remote UE and the relay UE, i.e. traffic ending at the relay UE (non-routed traffic between remote UE and relay UE) and traffic not ending at the relay UE (routed traffic between UE and network). The relay UE has two roles for traffic delivery (relay and not relay) when dealing with SL traffic from the remote UE.

FIG. 6 shows an exemplary diagram 600 for the two types of data/signaling traffic that may be carried between a relay UE 610 and a remote UE 615 connected by a sidelink (SL). The remote UE 615 may transfer to the relay UE 610 first data/signaling 620 destined for the relay UE 610 or second data/signaling 625 destined for the network 605 (via the relay UE 610) on the uplink (UL). Regarding the downlink (DL), the relay UE 610 may transfer to the remote UE 615 first data/signaling 620 originating at the relay UE 610 or second data/signaling 625 originating at the network 605 (and forwarded by the relay UE 610).

On the UL, there is no current functionality for informing the relay UE about the destination of traffic being received from the remote UE on the SL. On the DL, there is no current functionality for the remote UE to differentiate between traffic originating at the relay UE and traffic originating at the network if the relay UE combines the two kinds of traffic together. The remote UE is not able to deliver the different types of traffic (combined in a PDU) into different RLC/PDCP instances.

According to various exemplary embodiments described herein, operations are defined to enable a differentiation of traffic for UEs in a Layer 2 (L2) relay operation.

In some exemplary embodiments, a Type field is added to a SL MAC subheader to indicate one of two different types of traffic. FIG. 7*a* shows a sidelink (SL) MAC subheader 700 with a one-bit Type field 705 for indicating non-routed traffic (e.g., UE-UE traffic) or routed traffic (e.g., UE-NW relay traffic) over a SL. The Type field 705 may be a repurposed reserve (R) bit from an existing MAC subheader.

FIG. 7*b* shows a signaling diagram 750 for traffic transmitted between a remote UE 765, a relay UE 760 and a gNB 755 according to a first exemplary embodiment. The signaling diagram 750 relates to traffic originating at the remote UE 765 and being destined for either the relay UE 760 (non-routed SL traffic) or the gNB 755 (routed uplink (UL) traffic), although this exemplary embodiment may be modified for downlink (DL) traffic, to be described further below.

Non-routed traffic between the remote UE 765 and the relay UE 760 (not originating or terminating at the gNB 755) may be indicated in the MAC subheader 700 with the Type field 705 set to "0," while routed traffic between the remote UE 765 and the gNB 755 (using the relay UE 760 as a relay node) may be indicated in the MAC subheader 700 with the Type field 705 set to "1." As shown in FIG. 7*b*, a payload 770 transmitted from the remote UE 765 and indicated as being destined for the relay UE 760 will terminate at the relay UE 760. A payload 775 transmitted from the remote UE 765 and indicated as being destined for the gNB 755 will be forwarded from the relay UE 760 to the gNB 755.

The relay UE 760 and the remote UE 765 can identify each other with a same UE ID in the source ID and destination ID fields of the SL MAC subheader 700, e.g., because the Type field will identify the specific UE (remote or relay) to which data is addressed. In some exemplary embodiments, there may only be one SL MAC subheader. In this scenario, the two types of traffic cannot be multiplexed into the same MAC PDU, as shown in the exemplary signaling diagram 750 of FIG. 7*b*. For example, the non-routed traffic is transmitted via a first PDU session and the routed UE-to-NW traffic is transmitted via a second PDU session. In other exemplary embodiments, more than one SL MAC subheader may be used and, then the two types of traffic may be multiplexed into the same MAC PDU.

Regarding the DL, the MAC subheader 700 may be used in a substantially similar manner as on the UL for differentiating non-routed traffic from the relay UE 760 to the remote UE 765 that originated either at the relay UE 760 (and does not involve the network) or routed traffic from the gNB 755 (and uses the relay UE 760 to forward the traffic to the remote UE 765). For example, the relay UE 760 may receive routed traffic from the gNB 755 for routing to the remote UE 765 and may also process traffic originating at the relay UE 760 to be sent directly to the remote UE 765. The relay UE 760 may differentiate between the traffic types using the MAC subheader 700 and indicating the source of the traffic using the Type field as described above.

In some exemplary embodiments, different logical channels may be configured by the gNB for the different types of traffic. A first logical channel ID (LCID) may be used to indicate non-routed traffic (e.g., UE-UE traffic), and a second LCID may be used to indicate routed traffic (e.g., UE-NW traffic). The exemplary embodiments as described below have the benefits of the two types of traffic being able to be multiplexed into one MAC PDU. Further, only one UE ID is needed for the relay UE.

For traffic from the remote UE to the network, an SL signaling radio bearer (SLRB) may be configured by the relay UE. The SRB for these transmissions may come from the gNB, in accordance with the procedure found in the <RemoteUE RRC Connection Procedure>.

For traffic from the remote UE to the relay UE, a sidelink radio bearer (SLRB) may be configured differently according to the following scenarios. In a first scenario, the remote UE may be within the network coverage of the gNB. In this scenario, the remote UE requests a UE-specific SLRB configuration from the gNB. The remote UE sends the SLRB request message to the gNB and the gNB configures an SL logical channel dedicated for non-routed traffic, e.g., the gNB may send a unicast message to configure the SL logical channel. In a second scenario, when the remote UE is within the network coverage of the gNB, the gNB may perform a cell-specific SLRB configuration, in which the gNB configures the SLRB with a logical channel dedicated for non-routed traffic, e.g., the gNB may send a broadcast message to configure the SL logical channel. In a third second scenario, the remote UE may be out of coverage of the gNB. In this scenario, a preconfigured SLRB logical channel is dedicated for non-routed traffic, e.g., a configuration previously stored on the remote UE that is defined by standard, from a previous connection to the gNB or network, etc.

Figure 8A:
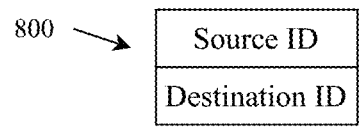
FIG. 8a shows an SL MAC subheader according to various exemplary embodiments described herein.

FIG. 8a shows an SL MAC subheader 800 according to various exemplary embodiments described herein. The MAC subheader 800 may be an existing MAC subheader and include a source LCID and a destination LCID (and not including a Type field, as described above for the MAC subheader 700).

Figure 8B:
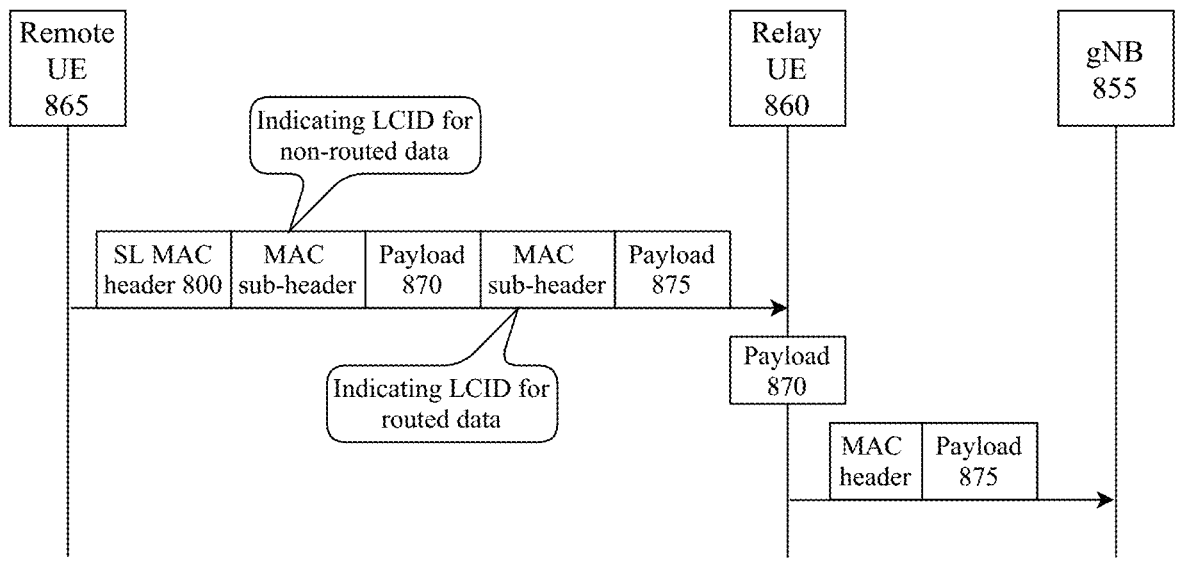
FIG. 8b shows a signaling diagram for traffic transmitted between a remote UE, a relay UE and a gNB according to a second exemplary embodiment.

FIG. 8b shows a signaling diagram 850 for traffic transmitted between a remote UE 865, a relay UE 860 and a gNB 855 according to various exemplary embodiments. The signaling diagram 850 relates to traffic originating at the remote UE 865 and being destined for either the relay UE 860 (non-routed traffic) or the gNB 855 (routed uplink (UL) traffic), although this exemplary embodiment may be modified for downlink (DL) traffic, to be described further below.

Non-routed traffic between the remote UE 865 and the relay UE 860 (not terminating at the gNB 855) may be indicated in the MAC subheader 800 with the Destination ID for the LCID corresponding to the channel between the remote UE 865 and the relay UE 860. Routed traffic between the remote UE 865 and the gNB 855 (using the relay UE 860 as a relay node) may be indicated in the MAC subheader 800 with the Destination ID for the LCIS corresponding to the channel between the remote UE 865 and the gNB 855. As shown in FIG. 8b, a payload 870 transmitted from the remote UE 865 and indicated as being destined for the relay UE 860 will terminate at the relay UE 860. A payload 875 transmitted from the remote UE 865 and indicated as being destined for the gNB 855 will be forwarded from the relay UE 860 to the gNB 855.

Regarding the DL, the MAC subheader 800 may be used in a substantially similar manner as on the UL for differentiating traffic from the relay UE 860 to the remote UE 865 that originated either at the relay UE 860 (and does not involve the network) or at the gNB 855 (and uses the relay UE 860 to forward the traffic to the remote UE 865). For example, the relay UE 860 may receive traffic from the gNB 855 for routing to the remote UE 865 and may also process traffic originating at the relay UE 860 to be sent directly to the remote UE 865. The relay UE 860 may differentiate between the traffic types using the MAC subheader 800 and indicating the source of the traffic with the LCID of the source.

According to other exemplary embodiments, a set of LCID ranges can be reserved to distinguish traffic termination either at the relay UE or the gNB. These exemplary embodiments operate based on an LCID split between the two kinds of traffic termination. These exemplary embodiments may be applied even if the different traffic is multiplexed in the same MAC PDU.

A standardized LCID threshold (LCIDthresh) value may be defined, such that this split handling is implicit. For example, all traffic destined for termination at the Relay UE may use LCIDs less than the LCIDthresh, while all traffic destined for the gNB may use LCIDs greater than the LCIDthresh.

Figure 8C:
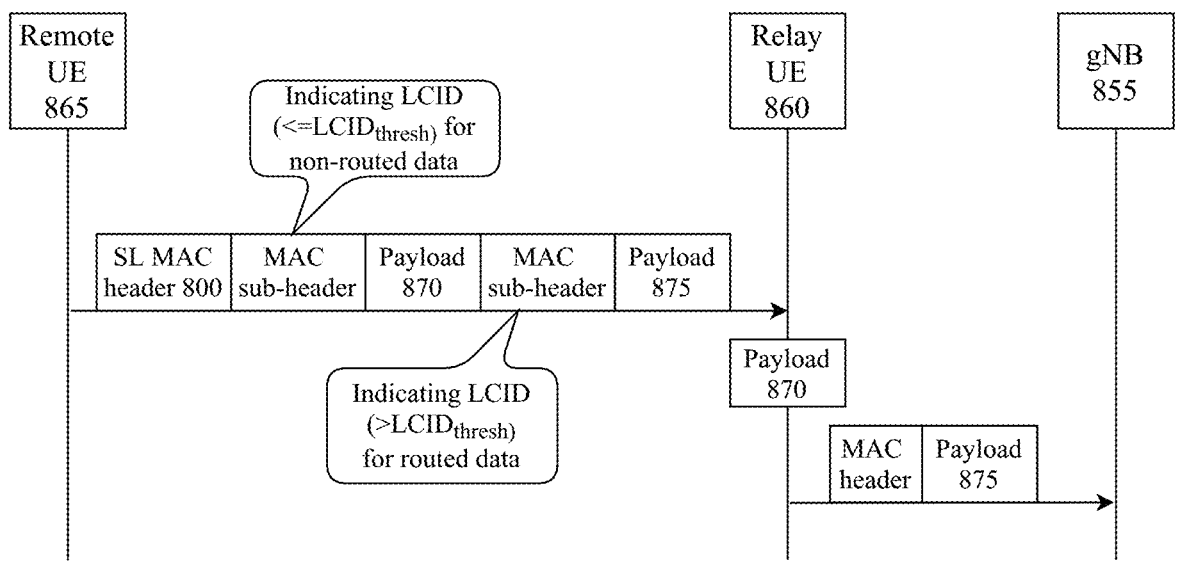
FIG. 8c shows a signaling diagram for traffic transmitted between the remote UE, the relay UE and the gNB according to an alternative to the second exemplary embodiment.

FIG. 8c shows a signaling diagram 880 for traffic transmitted between the remote UE 865, the relay UE 860 and the gNB 855 according to various exemplary embodiments. The signaling diagram 880 is substantially similar to the signaling diagram 850 discussed above with respect to FIG. 8b. However, the source/destination ID fields of the MAC subheader 800 may comprise any ID within a range of IDs, as discussed above. When the LCID is greater than or less than the LCIDthresh, the traffic corresponding to the MAC subheader 800 is routed to the corresponding destination.

In further exemplary embodiments, two IDs may be defined for the two roles of the relay UE. Currently, the application server (AS) layer UE ID is derived from the upper layer UE ID. According to the further exemplary embodiments, the upper layers may allocate two UE IDs to the relay UE (a normal UE ID for UE-to-UE SL communications (non-routed traffic) and a relay UE ID for UE-to-NW relay communications (routed traffic)). The two UE IDs for the relay UE are independent, and the two types of traffic may not be multiplexed into one MAC PDU.

FIGS. 9a-9b show discovery procedures using the two UE IDs for the relay UE according to various exemplary embodiments. In FIG. 9a, the "normal" UE ID is used by the relay UE in the discovery announcement to establish one-to-one communication with the remote UE for non-routed service. In FIG. 9b, the "relay" UE ID is used by the relay UE in the discovery announcement to establish one-to-one communication with the remote UE for routed service.

FIGS. 9c-9d show SL MAC subheaders 900, 905 for the uplink (UL) and the downlink (DL), respectively, according to a third exemplary embodiment. In FIG. 9c, the Destination ID field of the SL MAC subheader 900 (UL) may comprise either one of the two UE IDs discussed above. In FIG. 9d, the Source ID field of the SL MAC subheader 905 (DL) may comprise either one of the two UE IDs discussed above, to be described further below.

FIG. 9e shows a signaling diagram 950 for traffic transmitted between a remote UE 965, a relay UE 960 and a gNB 955 according to a third exemplary embodiment. The signaling diagram 950 relates to traffic originating at the remote UE 965 and being destined for either the relay UE 960 (SL traffic) or the gNB 955 (uplink (UL) traffic), although this exemplary embodiment may be modified for downlink (DL) traffic, to be described further below. When the normal UE ID is used by the remote UE 965 in the MAC subheader 900, the payload 970 corresponding to the MAC subheader 900 will terminate at the relay UE 965. When the relay UE ID is used by the remote UE 965 in the MAC subheader 900, the payload 975 corresponding to the MAC subheader 900 will be routed by the relay UE 965 to the gNB 955.

Regarding the DL, the MAC subheader 905 may be used in a similar manner as on the UL for differentiating traffic from the relay UE 960 to the remote UE 965 that originated either at the relay UE 960 (and does not involve the network) or at the gNB 955 (and uses the relay UE 960 to forward the traffic to the remote UE 965). For example, the relay UE 960 may receive traffic from the gNB 955 for routing to the remote UE 965 and may also process traffic originating at the relay UE 960 to be sent directly to the remote UE 965. The relay UE 960 may differentiate between the traffic types using the MAC subheader 905 and indicating the source of the traffic with either the normal UE ID or the relay UE ID.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalents.

The invention claimed is:

1. A user equipment (UE), comprising:
a transceiver configured to communicate with at least a further UE via a sidelink (SL); and
a processor communicatively coupled to the transceiver and configured to perform operations comprising:
establishing a first unicast link with the further UE for non-routed traffic between the UE and the further UE;
establishing a second unicast link with the further UE for routed traffic to a base station of a network;
encoding traffic for transmission to the further UE, wherein the traffic is one of non-routed traffic and routed traffic and wherein the traffic comprises a payload and a medium access control (MAC) subheader; and
transmitting the traffic to the further UE.

2. The UE of claim 1, wherein the UE is a remote UE and the further UE is a relay UE, wherein the MAC subheader indicates whether the payload corresponds to the non-routed traffic between the UE and the further UE or routed traffic between the UE and a base station, the MAC subheader indicating the non-routed traffic as SL traffic to terminate at the relay UE or indicating the routed traffic as uplink (UL) traffic to be relayed by the relay UE to the base station.

3. The UE of claim 2, wherein the indication in the MAC subheader comprises a one bit Type field.

4. The UE of claim 2, wherein, when the payload is SL traffic, wherein the operations further comprise:
multiplexing the payload and a further payload comprising UL traffic together into a same MAC protocol data unit (PDU).

5. The UE of claim 2, wherein the indication in the MAC subheader comprises a first logical channel ID (LCID) indicating the SL traffic or a second LCID indicating the UL traffic.

6. The UE of claim 5, wherein the operations further comprise:
receiving an SL signaling radio bearer (SLRB) configuration from one of the relay UE or the base station for transmitting further SL traffic.

7. The UE of claim 5, wherein the operations further comprise:
transmitting an SL signaling radio bearer (SLRB) request message to the base station for a UE-specific SLRB configuration when the remote UE is in a coverage area of the base station; and
receiving an SL logical channel configuration dedicated for the SL traffic.

8. The UE of claim 5, wherein the operations further comprise:
receiving a cell-specific SL logical channel configuration dedicated for the SL traffic from the base station when the remote UE is in a coverage area of the base station.

9. The UE of claim 5, wherein the first LCID indicates the SL traffic when a value of the first LCID is less than a threshold and the second LCID indicates the UL traffic when a value of the second LCID is greater than the threshold.

10. The UE of claim 2, wherein the indication in the MAC subheader comprises a first LIE ID for the relay UE corresponding to SL traffic or a second UE ID for the relay UE corresponding to UL traffic.

11. The UE of claim 1, wherein the UE is a relay UE and the further UE is a remote UE, the MAC subheader indicating the non-routed traffic as SL traffic originating at the relay UE or indicating the routed traffic as downlink (DL) traffic originating at the base station and being relayed by the relay UE.

12. The UE of claim 11, wherein the indication in the MAC subheader comprises a one bit Type field.

13. The UE of claim 11, wherein, when the payload is SL traffic, wherein the operations further comprise:
multiplexing the payload and a further payload comprising DL traffic together into a same MAC protocol data unit (PDU).

14. The UE of claim 11, wherein the indication in the MAC subheader comprises a first logical channel ID (LCID) indicating the SL traffic or a second LCID indicating the DL traffic.

15. The UE of claim 14, wherein the operations further comprise:
configuring the remote UE with an SL signaling radio bearer (SLRB) configuration for transmitting further SL traffic.

16. The UE of claim 14, wherein the remote UE either i) transmits an SL signaling radio bearer (SLRB) request message to the base station for a UE-specific SLRB configuration when the remote UE and receives an SL logical channel configuration dedicated for the SL or (ii) receives a cell-specific SL logical channel configuration dedicated for the SL traffic from the base station, when the remote UE is in a coverage area of the base station.

17. The UE of claim 14, wherein the first LCID indicates the SL traffic when a value of the first LCID is less than a threshold and the second LCID indicates the DL traffic when a value of the second LCID is greater than the threshold.

18. The UE of claim 11, wherein the operations further comprise:
receiving a configuration for a first UE ID corresponding to SL traffic or a second UE ID corresponding to DL traffic,
wherein the indication in the MAC subheader comprises the first UE ID or the second UE ID.

19. The UE of claim 1, wherein the UE and the further UE are configured for Layer 2 (L2) relay operation by the base station.

20. A processor of a user equipment (UE) configured to perform operations comprising:

establishing a first unicast link with the further UE for non-routed traffic between the UE and the further UE;
establishing a second unicast link with the further UE for routed traffic to a base station of a network;
encoding traffic for transmission from the UE the further UE, wherein the traffic is one of non-routed traffic and routed traffic and wherein the traffic comprises a payload and a medium access control (MAC) subheader, and
transmitting the traffic to the further UE.

* * * * *